(12) United States Patent
Jeong

(10) Patent No.: US 8,800,981 B2
(45) Date of Patent: Aug. 12, 2014

(54) HANGER APPARATUS FOR VEHICLE AND CHANGER COMPRISING THE SAME

(75) Inventor: In Ho Jeong, Ulsan (KR)

(73) Assignee: Hyundai Motor Company, Seoul (KR)

( * ) Notice: Subject to any disclaimer, the term of this patent is extended or adjusted under 35 U.S.C. 154(b) by 424 days.

(21) Appl. No.: 13/171,343

(22) Filed: Jun. 28, 2011

(65) Prior Publication Data

US 2012/0145846 A1    Jun. 14, 2012

(30) Foreign Application Priority Data

Dec. 8, 2010    (KR) .................. 10-2010-0124906

(51) Int. Cl.
*B23Q 3/08* (2006.01)

(52) U.S. Cl.
USPC ................ 269/25; 269/24; 269/311; 269/228

(58) Field of Classification Search
USPC ........... 248/125.9, 128, 132, 157, 161, 278.1, 248/419, 201, 220.21, 224.8; 269/17, 32, 269/24–27, 311, 228; 224/400
See application file for complete search history.

(56) References Cited

U.S. PATENT DOCUMENTS

| | | | |
|---|---|---|---|
| 4,601,105 A * | 7/1986 | Yamazaki et al. | 33/600 |
| 5,027,502 A * | 7/1991 | Sakamoto et al. | 29/783 |
| 6,604,279 B2 * | 8/2003 | Kurtz | 29/705 |
| 7,516,968 B2 * | 4/2009 | Cortez et al. | 280/124.116 |
| 8,292,282 B2 * | 10/2012 | Gao et al. | 269/311 |
| 8,297,604 B2 * | 10/2012 | Doan et al. | 269/32 |
| 2006/0219525 A1 * | 10/2006 | Dohi | 198/685 |
| 2007/0261499 A1 * | 11/2007 | Hamilton | 73/798 |
| 2010/0140860 A1 * | 6/2010 | Gao et al. | 269/311 |
| 2012/0137490 A1 * | 6/2012 | Kweon et al. | 29/428 |
| 2012/0313342 A1 * | 12/2012 | Ramsey | 280/124.157 |
| 2013/0106042 A1 * | 5/2013 | Gao et al. | 269/289 R |
| 2013/0140419 A1 * | 6/2013 | Kim et al. | 248/309.3 |

FOREIGN PATENT DOCUMENTS

| | | |
|---|---|---|
| KR | 1998-0008461 | 4/1998 |
| KR | 10-0879071 B1 | 1/2009 |
| KR | 10-0892708 B1 | 4/2009 |

* cited by examiner

*Primary Examiner* — Nkeisha Smith
(74) *Attorney, Agent, or Firm* — Edwards Wildman Palmer LLP; Peter F. Corless

(57) ABSTRACT

A hanger apparatus for a vehicle and a changer comprising the same are provided herein, which are configured to correspond to a multitude of vehicle components (e.g., bodies or panels) of different shapes and sizes according to vehicle type and are commonly applicable to various types of vehicles by utilizing variable locating units capable of varying locating positions according to vehicle type and automatically varying the variable locating units.

9 Claims, 6 Drawing Sheets

<S1>

<S2>

HANGER APPARATUS FOR VEHICLE AND CHANGER COMPRISING THE SAME

CROSS-REFERENCE TO RELATED APPLICATION

This application claims priority to and the benefit of Korean Patent Application No. 10-2010-0124906 filed in the Korean Intellectual Property Office on Dec. 8, 2010, the entire contents of which are incorporated herein by reference.

BACKGROUND OF THE INVENTION (a) Field of the Invention

The present invention relates to a hanger apparatus for a vehicle and a changer comprising the same. More particularly, the present invention relates to a hanger apparatus for a vehicle, which is configured to correspond to vehicle bodies or panels of different shapes and sizes and commonly applicable to various types of vehicles, and a changer comprising the same.

(b) Description of the Related Art

Generally, a vehicle is manufactured by numerous assembling processes using about twenty to thirty thousands of parts. In particular, a vehicle body is formed by a first assembling process in which vehicle body panels are produced in a press process, and each part of the vehicle body is then assembled in a vehicle body factory to form a vehicle body of a body-in-white (B.I.W) state. Such a vehicle body or a panel formed by press working, mounted on a hanger apparatus, is transferred to a main body process and assembled to form the exterior of the vehicle body, and painted in a painting process. After that, an engine, a transmission, an interior, and an exterior are assembled in an outfitting process. The vehicle body or panel, mounted on a hanger apparatus, is transferred typically by a transfer robot, a carriage, or an Electric Monorail System (EMS) installed in an upper area of the workplace and undergoes their respective processes.

However, it is difficult to apply the afore-mentioned conventional hanger apparatus commonly to panels for different vehicle types as the panels come in different shapes and sizes according to vehicle type. Thus, it is necessary to manufacture dedicated hanger apparatuses according to vehicle type in an assembly line.

Moreover, manufacturing dedicated hanger apparatuses according to vehicle type involves the problems that the investment costs will increase each time a new vehicle type is introduced because of additional costs of remodeling and making a new hanger apparatus, and the structure of the hanger apparatus will become more and more complicated The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a hanger apparatus for a vehicle, which comprises variable locating units capable of varying the locating positions according to vehicle type, and is commonly applicable to various types of vehicles as the variable locating units are configured to be automatically varied, and a changer comprising the same.

An exemplary embodiment of the present invention provides a hanger apparatus for a vehicle. This apparatus includes a hanger frame and a plurality of fixed locators mounted on the hanger frame to support a vehicle component (e.g., a body or panel) which is to be mounted on the hanger frame. In addition, the apparatus also includes variable locating units mounted on the hanger frame. These variable locating units are for varying the locating positions for supporting the vehicle component.

More specifically, each of the variable locating units may include a mounting bracket fixed to the hanger frame and a variable locator rotatably hinged to the mounting bracket. The variable locator has a fixing protrusion formed at a lower side thereof. This fixing protrusion corresponds to a fixing means/mechanism mounted on the mounting bracket to support the fixing protrusion and prevent the rotation of the variable locator. Furthermore, a fixing pin inserted into a hole formed in a vehicle component (e.g., body or panel) may be mounted on top of the variable locator.

The fixing means/mechanism described above may include a mounting block fixed to an upper side of the mounting bracket; an upper fixing plate provided above the mounting block; connecting rods connected to the upper fixing plate; a lower fixing plate movably provided below the mounting block on the connecting rods; and elastic members respectively provided along the connecting rods and interposed between the mounting block and the lower fixing plate.

Another exemplary embodiment of the present invention provides a hanger apparatus changer including: a hanger apparatus has a hanger frame, a plurality of fixed locators mounted on the hanger frame to support a vehicle component (e.g., body or panel) which is to be mounted on the hanger frame, and variable locating units mounted on the hanger frame. These variable locating units vary the locating position, a base frame, and a plurality of variable units which are installed on the base frame, respectively corresponding to the variable locating units of the hanger apparatus, to operate the variable locating units.

The variable locating unit may include a mounting bracket fixed to the hanger frame and a variable locator rotatably hinged to the mounting bracket. The variable locator has a fixing protrusion formed at a lower side thereof, and a fixing pin mounted on top thereof which is to be inserted into a hole formed in a vehicle component (e.g., body or panel). Additionally, the variable locating unit may also include a fixing means/mechanism mounted on the mounting bracket, corresponding to the fixing protrusion of the variable locator to support the fixing protrusion and prevent the rotation of the variable locator.

This variable unit may include a first fixing bracket mounted on the base frame; a first operating cylinder comprising a first operating rod, and mounted on top of the first fixing bracket to downwardly rotate the variable locator by the back-and-forth operation of the first operating rod; a second fixing bracket mounted on top of the base frame, corresponding to the fixing means/mechanism; and a second operating cylinder. This second cylinder has a second operating rod that is mounted on the second fixing bracket to release the variable locator fixed by the fixing means/mechanism. Also, the variable unit may also include a restoring means/mechanism installed at a top portion of the base frame to upwardly rotate the variable locator rotated downward by the first operating cylinder and restore the variable locator to the original position.

In some embodiments of the present invention, a detecting sensor for detecting the fixing or releasing of the fixing means/mechanism may be mounted at an upper portion of the first fixing bracket corresponding to the fixing means/mechanism.

In yet other embodiments of the present invention, the restoring means/mechanism may include a third fixing bracket mounted at an upper side of the base frame which corresponds to the variable locating unit and a third operating cylinder. The third operating cylinder has a third operating rod which has one side hinged to one side of the third fixing bracket; a rotating arm whose one side is hinged to an upper side of the third fixing bracket via a hinge link and whose rear end is hingeably mounted on the end of the third operating rod; and a contact block mounted on the end of the rotating arm so as to transfer the torque of the rotating arm which rotates by operating the third operating cylinder, and is selectively contacted with the variable locator. In this embodiment, the contact block may be formed in a cylindrical shape. Furthermore, in even yet further embodiments a guide plate for guiding the hanger frame may be mounted at one end of the base frame.

The fixing means/mechanism may includes a mounting block fixed to an upper side of the mounting bracket; an upper fixing plate provided above the mounting block; connecting rods connected to the upper fixing plate; a lower fixing plate movably provided below the mounting block on the connecting rods; and elastic members respectively provided along the connecting rods and interposed between the mounting block and the lower fixing plate.

The variable unit may include a first fixing bracket mounted on the base frame; a first operating cylinder comprising a first operating rod, and mounted on top of the first fixing bracket to downwardly rotate the variable locator by the back-and-forth operation of the first operating rod; a second fixing bracket mounted on top of the base frame, corresponding to the fixing means/mechanism; and a second operating cylinder. This second cylinder has a second operating rod mounted on the second fixing bracket to release the variable locator fixed by the fixing means/mechanism; and a restoring means/mechanism installed at a top portion of the base frame to upwardly rotate the variable locator rotated downward by the first operating cylinder and restore the variable locator to the original position.

Advantageously, the hanger apparatus for a vehicle and the changer comprising the same according to the exemplary embodiment of the present invention adapts to vehicle bodies or panels of different shapes and sizes according to vehicle type and is commonly applicable to various types of vehicles by using the variable locating units which are capable of varying the locating positions according to vehicle type and automatically varying the variable locating units.

Moreover, the hanger apparatus for a vehicle and the changer having the same, according to the exemplary embodiment of the present invention, can reduce initial investment costs, simplify the overall system configuration, and improve workability as they are commonly applicable to various types of vehicles.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
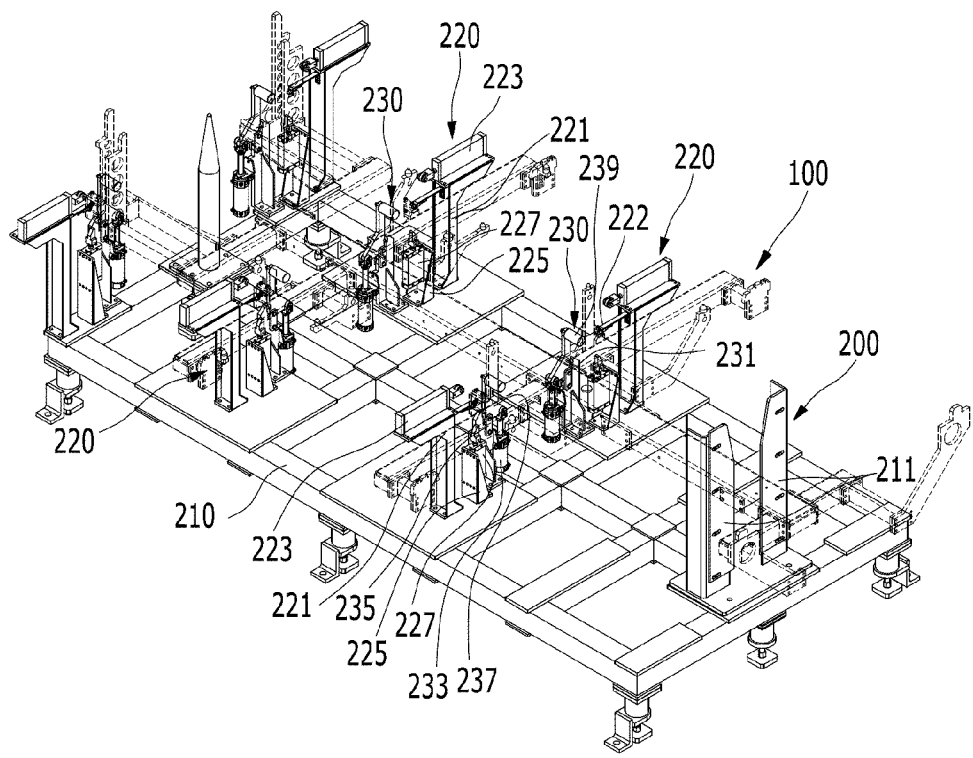
FIG. 1 is a perspective view of a hanger apparatus for a vehicle and a changer comprising the same according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

An exemplary embodiment of the present invention will hereinafter be described in detail with reference to the accompanying drawings.

The embodiment described in the present specification and the configuration shown in the drawings are merely an exemplary embodiment of the present invention and do not represent all of the technical spirit of the present invention. Thus, it should be understood that there may be various equivalents and modified examples that can replace the embodiments described in the present specification and the configuration shown in the drawings at the time of filing the present application.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 2:
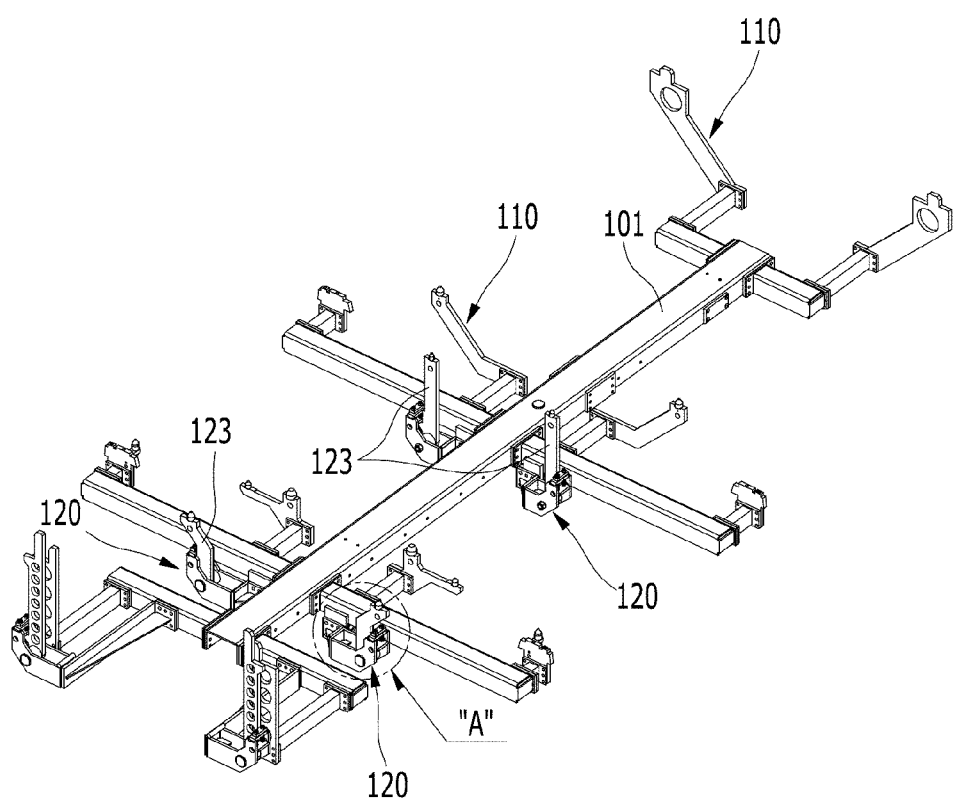
FIG. 2 is a perspective view of the hanger apparatus for a vehicle according to the exemplary embodiment of the present invention.
Figure 3:
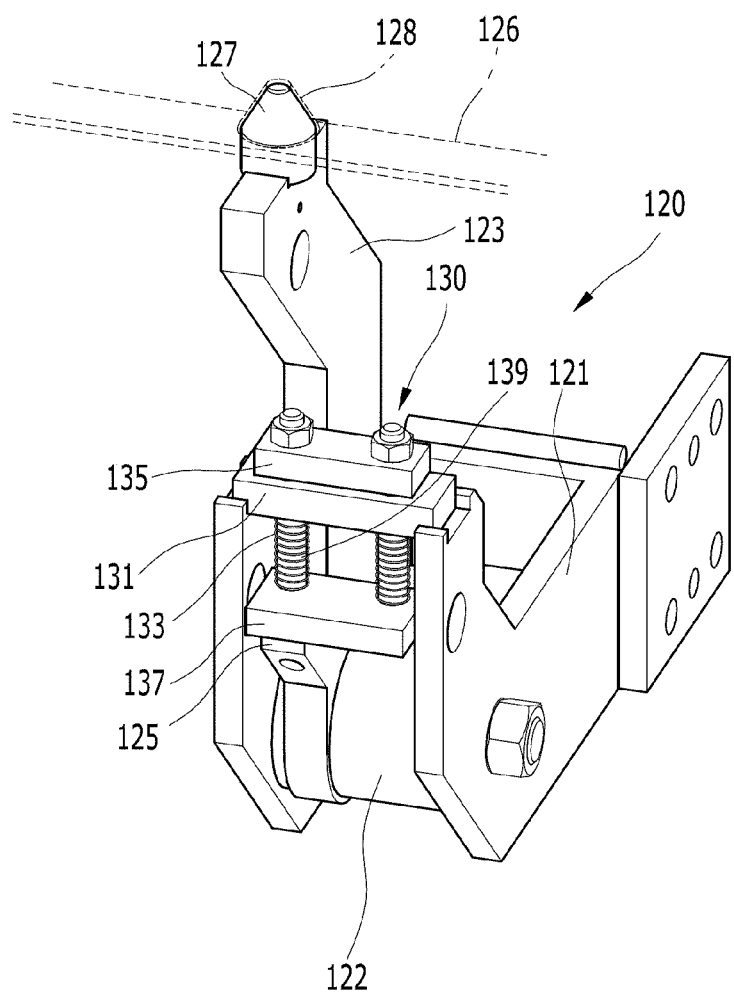
FIG. 3 is an enlarged perspective view of A portion of FIG. 1.
Figure 4:
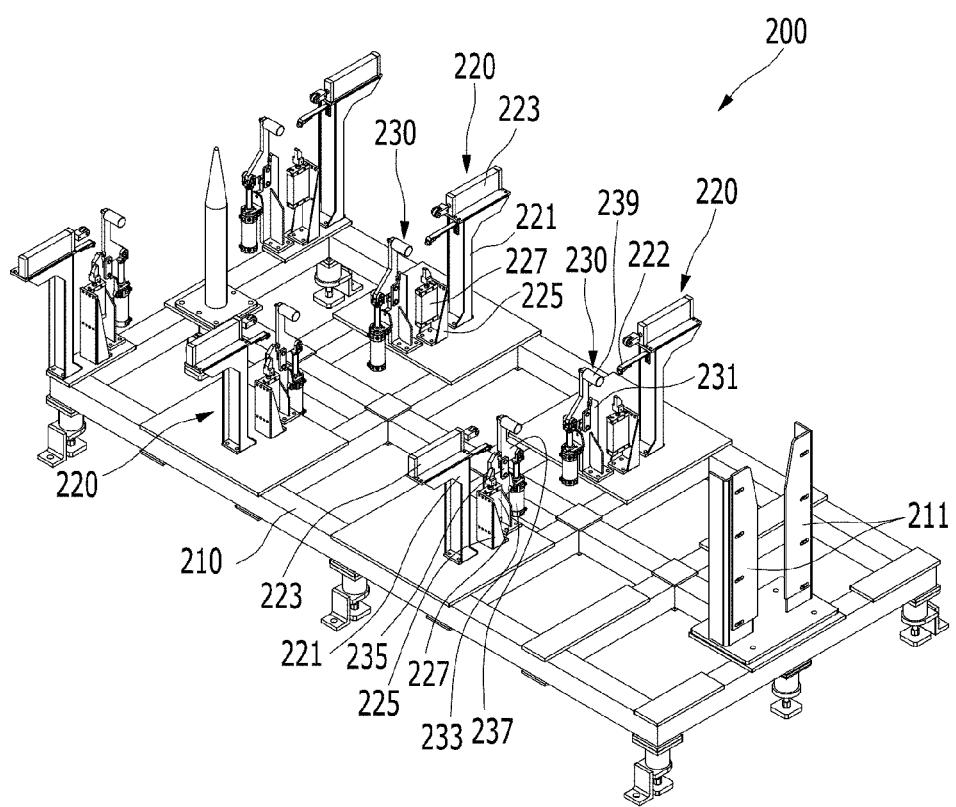
FIG. 4 is a perspective view of a hanger apparatus changer for a vehicle according to the exemplary embodiment of the present invention.
Figure 5:
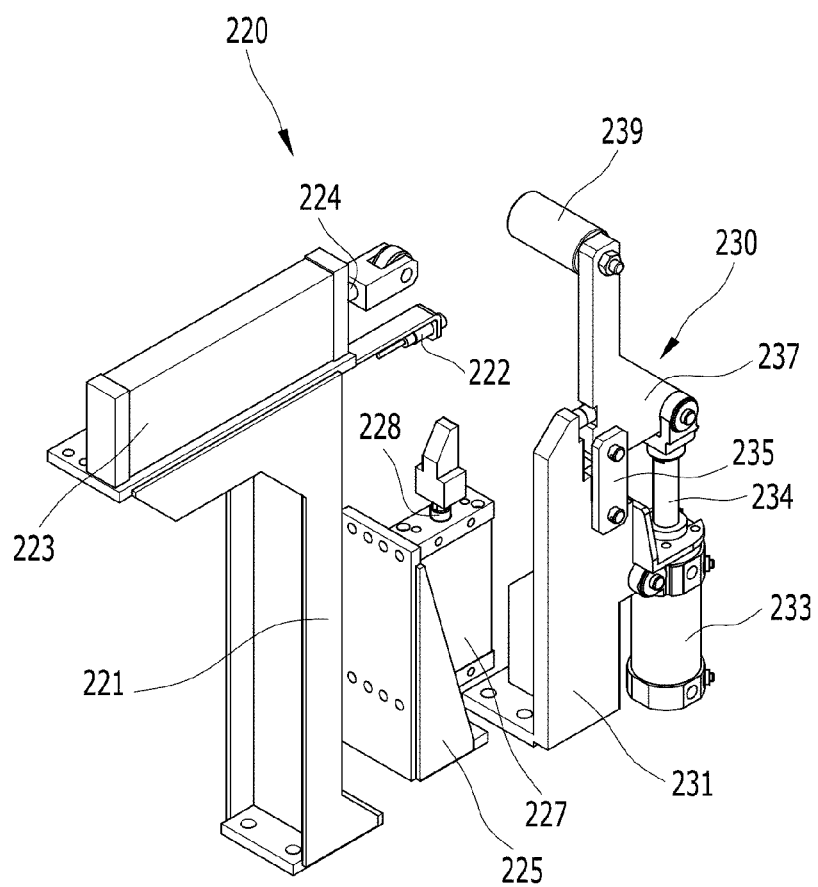
FIG. 5 is an enlarged perspective view of B portion of FIG. 4.

FIG. 1 is a perspective view of a hanger apparatus for a vehicle and a changer having the same according to an exemplary embodiment of the present invention. FIG. 2 is a perspective view of the hanger apparatus for a vehicle according to the exemplary embodiment of the present invention. FIG. 3 is an enlarged perspective view of A portion of FIG. 1. FIG. 4 is a perspective view of a hanger apparatus changer for a vehicle according to the exemplary embodiment of the present invention. FIG. 5 is an enlarged perspective view of B portion of FIG. 4.

Referring to the drawings, a hanger apparatus 100 for a vehicle and a changer 200 comprising the same according to an exemplary embodiment of the present invention has variable locating units 120 capable of varying the positions according to a vehicle type and variable units 220 for automatically varying the positions of the variable locating units 120. Thus, the hanger apparatus 100 can correspond to vehicle bodies or panels having different shapes and sizes according to vehicle type, and be commonly applicable to various types of vehicles.

To this end, first, the hanger apparatus 100 for a vehicle according to an exemplary embodiment of the present invention has, as shown in FIGS. 1 and 2, a hanger frame 101, a plurality of fixed locators 110 mounted on the hanger frame 101, and a plurality of variable locating units 120 provided between the fixed locators 110, mounted on the hanger frame 101, and configured to vary the locating positions according to vehicle body's or panel's having a different shape for each vehicle type. The hanger frame 101 is transferred to a relevant process by an electric monorail system (EMS) installed in an upper area of the workplace, a robot and so on.

In the present exemplary embodiment, each variable locating unit 120 includes, as shown in FIG. 3, a mounting bracket 121, a variable locator 123, and fixing means/mechanism 130.

More specifically, one end of the mounting bracket 121 is fixedly mounted to the frame 101. For example, in some embodiments of the present invention, the mounting bracket 121 may be a U-shaped bracket. The variable locator 123 is hinged to a hinge shaft 122 in between the mounting brackets 121, and has a fixing protrusion 125 formed at a lower side thereof. A fixing pin 127 is formed on top of the variable locator 123, which is inserted into a hole 128 formed in a vehicle component (e.g., body or panel) 126 to stably support the vehicle component (e.g., body or panel) 126. The fixing means/mechanism 130 is mounted on the mounting bracket 121, corresponding to the fixing protrusion 125 of the variable locator 123, and holds and fixes the fixing protrusion 125 to thereby prevent the rotation of the variable locator 123. Furthermore, the fixing means/mechanism 130 includes a mounting block 131, an upper and lower fixing plates 135 and 137, a connecting rod 133, and an elastic member 139.

The mounting block 131 is fixed to an upper side of the mounting bracket 121 and the upper and lower fixing plates 135 and 137 are respectively disposed above and below the mounting block 131, and are interconnected by the connecting rod 133 so that the lower fixing plate 137 is movable on the connecting road 133. The lower fixing plate 137 holds the fixing protrusion 125 of the variable locator 123, to thereby fix the variable locator 123.

The elastic members 139 are provided along the respective connecting rods 133, and interposed between the mounting block 131 and the lower fixing plate 137 to provide elastic force to the lower fixing plate 137. One end of the elastic member 139 is supported by the mounting block 131 and the other end thereof is supported by the lower fixing plate 137. For example, the elastic member 139 may be a coil spring.

The hanger apparatus 100 having the above-described configuration is transferred to the relevant process, with a vehicle component (e.g., body or panel) disposed on the top thereof by means of the fixing locators 110 and the variable locating units 120.

Advantageously, the hanger apparatus 100 is commonly applicable to various types of vehicles as the position of the variable locator 123 is varied by means of the variable locating unit 120 according to the shape of the vehicle's component (e.g., body or panel).

The hanger apparatus changer 200 for a vehicle according to the exemplary embodiment of the present invention is applied to vary the position of the variable locator 123 of the variable locating unit 120 included in the hanger apparatus 100 having the aforementioned configuration according to the type of vehicle being assembled.

That is, the hanger apparatus changer 200 varies the position of the variable locator 123 by downwardly rotating the variable locator 123 or upwardly rotating the variable locator 123 in a downward position above the hanger frame 101 according to whether re-locating is required or not. The hanger apparatus changer 200 includes, as shown in FIG. 4, a base frame 210 and a plurality of variable units 220 which are installed on the base frame 210, respectively corresponding to the variable locating units 120. These variable units 220 vary the positions of the variable locators 123. Additionally, a guide plate 211 is mounted on the base frame 210 to guide the hanger frame 101.

In the present exemplary embodiment, the variable unit 220 as shown in FIG. 5, are made up of a first and second fixing brackets 221 and 225, first and second operating cylinders 223 and 227, and a restoring means/mechanism 230.

In this embodiment, the first fixing bracket 221 is mounted on top of the base frame 210. The first operational cylinder 223 has a first operating rod 224, and is mounted on top of the first fixing bracket 221 to thereby downwardly rotate the variable locator 123 downward by the back-and-forth operation of the first operating rod 224. In this exemplary embodiment, the second fixing bracket 225 is mounted on top of the base frame 210, corresponding to the fixing means/mechanism 130. The second operating cylinder 227 has a second operating rod 228 is mounted on the second fixing bracket 225. The second operating cylinder 227 releases the fixing of the variable locator 123, which is fixed by the fixing means/mechanism 130, by the back-and-forth operation of the second operating rod 228.

Additionally, a detecting sensor 222 is mounted at an upper portion of the first fixing bracket 221 to detect the proximity of the lower fixing plate 137 of the fixing means/mechanism 130.

For example, if the second operating rod 228 of the second operating cylinder 227 ascends to lift the lower fixing plate 137 and release the fixing of the variable locator 123 of the fixing means/mechanism 130, the detecting sensor 222 detects the proximity of the lower fixing plate 137 and determines whether to start or operate the first operating cylinder 223.

The restoring means/mechanism 230 is installed on top of the base frame 210 and upwardly rotates the variable locator 123 rotated downward by the first operating cylinder 223 to restore it to the original position. The restoring means/mechanism 230 is made up of a third fixing bracket 231, a third operating cylinder 233, a rotating arm 237, and a contact 239.

The third fixing bracket 231 is mounted on top of the base frame 210, and corresponds to the variable locating unit 120. The third operating cylinder 233 has a third operating rod 234, and one side thereof is hinged to the third fixing bracket 231. One side of the rotating arm 237 is hinged to an upper side of the third fixing bracket 231 via a hinge link 235, and the rear end thereof is hinged to the end of the third operating rod 234.

The contact block 239 is mounted on the end of the rotating arm 237 so as to transfer the torque of the rotating arm 237 which is rotated by the operation of the third operating cylinder 233, and is selectively in contacted with the variable locator 123. The contact block 239 is preferably formed in a cylindrical shape so that friction is minimized upon contact with the variable locator 123 to upwardly rotate the variable locator 123.

The hanger apparatus changer 200 thus configured varies the position of the variable locator 123 of the variable locating unit 120 by operating the variable unit 220, with the hanger apparatus 100 being inserted thereon. Hereinafter, the operation and operational effect of the hanger apparatus changer 200 for a vehicle according to the exemplary embodiment of the present invention will be described in detail.

Figure 6:
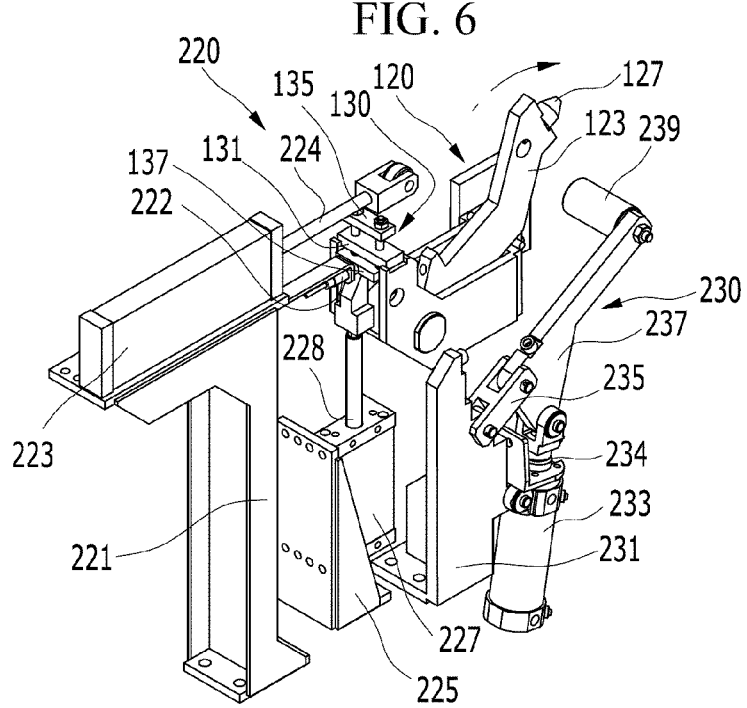
FIG. 6 is a view showing the use state of a variable unit applied to the hanger apparatus changer for a vehicle according to the exemplary embodiment of the present invention.
Figure 6:
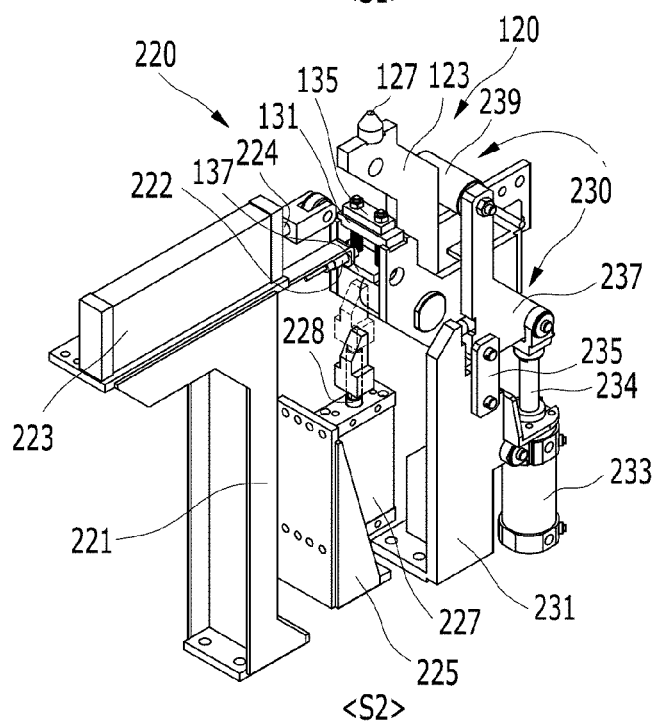

FIG. 6 is a view showing the use state of a variable unit applied to the hanger apparatus changer for a vehicle according to the exemplary embodiment of the present invention.

Referring to the drawing, if the angle of the variable locating unit 120 is adjusted so as to correspond to the vehicle's component (e.g., body or panel) 126 to be mounted on top of the hanger apparatus 100, the second operating cylinder 227 moves the second operating rod 228 forward, thus lifting the lower fixing plate 137 of the fixing means/mechanism 130 as shown in (S1) of FIG. 6. Then, the locking of the fixing protrusion 125 of the variable locator 123 is released. At this point, the detecting sensor 229 detects the proximity of the lower fixing plate 137, and the first operating cylinder 223 is operated by the control of a controller (not shown). Accordingly, the first operating cylinder 223 moves the first operating rod 224 forward and rotates the released variable locator 123 downward, e.g., clockwise as viewed in the drawing.

When the downward rotation of the variable locator 123 is completed, the second operating cylinder 227 performs a backward operation, and the lower fixing plate 137 returns to its initial position by the elastic members 139.

At this point, the restoring means/mechanism is able to prevent the third operating rod 234 from being moved backward by the third operating cylinder 233 and having interference with the variable locator 123 which rotates downward by holding the rotating arm 237 in the downward rotated state.

On the other hand, if it is necessary to relocate the released variable locating unit 120, the second operating rod 228 is moved forward by the second operating cylinder 227 to lift the lower fixing plate 137 as shown in (S2) of FIG. 6.

In this state, the third operating cylinder 233 of the restoring means/mechanism performs a forward operation to move the third operating rod 234 forward. As a result, as the rotating arm 237 rotates, the variable locator 123 is located upward, i.e., clockwise as viewed in the drawing.

Thereafter, when the upward rotation of the variable locator 123 is completed, the second operating cylinder 227 performs a backward operation to move the second operating rod 228 backward. As a result, as the lower fixing plate 137 returns to the initial position by the elastic force of the elastic members 139, it locks the fixing protrusion 125 of the variable locator 123 to thus fix the variable locator 123.

The hanger apparatus changer 200 varies the position of the variable locator 123 of the variable locating unit 120 either corresponding or not corresponding to a vehicle's particular component (e.g., body or panel) for each vehicle type by repeatedly performing the above-described operation. Therefore, the hanger apparatus 100 for a vehicle and the changer 200 comprising the same, configured as above, according to the exemplary embodiment of the present invention corresponds to vehicle bodies or panels of different shapes and sizes and are commonly applicable to various types of vehicles by utilizing a variable locating units 120 that are capable of varying the locating positions according to vehicle type and automatically varying the variable locating units 120.

Moreover, the hanger apparatus 100 for a vehicle and the changer 200 comprising the same according to the exemplary embodiment of the present invention can reduce initial investment costs, simplify the overall system configuration, and improve workability as they are commonly applicable to various types of vehicles throughout an assembly line.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hanger apparatus for a vehicle, the apparatus comprising:
    a hanger frame;
    a plurality of fixed locators mounted on the hanger frame to support a vehicle component which is to be mounted on the hanger frame; and
    variable locating units mounted on the hanger frame, the variable locating units configured to vary locating positions for supporting the vehicle component,
    wherein each of the variable locating units comprises:
    a mounting bracket fixed to the hanger frame;
    a variable locator rotatably hinged to the mounting bracket, and having a fixing protrusion formed at a lower side thereof; and
    a fixing mechanism mounted on the mounting bracket, corresponding to the fixing protrusion of the variable locator, the fixing mechanism supporting the fixing protrusion and preventing rotation of the variable locator
    wherein the fixing mechanism comprises: a mounting block fixed to an upper side of the mounting bracket; an upper fixing plate provided above the mounting block; a connecting rod connected to the upper fixing plate; a lower fixing plate movably provided below the mounting block on the connecting rod; and an elastic member provided along the connecting rod and interposed between the mounting block and the lower fixing plate.

2. The hanger apparatus of claim 1, further comprising a fixing pin mounted on top of the variable locator and configured to be inserted into a hole formed in the vehicle component.

3. A hanger apparatus changer comprising:
    a hanger apparatus comprising a hanger frame, a plurality of fixed locators mounted on the hanger frame to support a vehicle component which is to be mounted on the hanger frame, and variable locating units mounted on the hanger frame, and for varying a locating position of the plurality of fixed locators;
    a base frame; and
    a plurality of variable units installed on the base frame, respectively corresponding to the variable locating units of the hanger apparatus, the plurality of variable units configured to operate the variable locating units,
    wherein each of the variable locating units comprises:
    a mounting bracket fixed to the hanger frame;
    a variable locator rotatably hinged to the mounting bracket, having a fixing protrusion formed at a lower side thereof, and having a fixing pin mounted on top thereof which is to be inserted into a hole formed in a vehicle body or panel; and
    a fixing mechanism mounted on the mounting bracket, corresponding to the fixing protrusion of the variable locator, the fixing mechanism supporting the fixing protrusion and preventing rotation of the variable locator
    wherein the fixing mechanism comprises: a mounting block fixed to an upper side of the mounting bracket; an upper fixing plate provided above the mounting block; a connecting rod connected to the upper fixing plate; a lower fixing plate movably provided below the mounting block on the connecting rod; and an elastic member provided along the connecting rod and interposed between the mounting block and the lower fixing plate.

4. The hanger apparatus changer of claim 3, wherein the variable unit comprises:
   a first fixing bracket mounted on the base frame;
   a first operating cylinder having a first operating rod, and mounted on top of the first fixing bracket to downwardly rotate the variable locator by back-and-forth operation of the first operating rod;
   a second fixing bracket mounted on top of the base frame, corresponding to the fixing mechanism;
   a second operating cylinder having a second operating rod, and mounted on the second fixing bracket to release fixing of the variable locator fixed by the fixing mechanism; and
   a restoring mechanism installed at a top portion of the base frame to upwardly rotate the variable locator rotated downward by the first operating cylinder and restore the variable locator to an original position.

5. The hanger apparatus changer of claim 4, further comprising a detecting sensor for detecting fixing and releasing of the fixing mechanism is mounted on an upper portion of the first fixing bracket corresponding to the fixing mechanism.

6. The hanger apparatus changer of claim 4, wherein the restoring mechanism comprises:
   a third fixing bracket mounted at an upper side of the base frame, corresponding to the variable locating unit;
   a third operating cylinder having a third operating rod, and having one side hinged to one side of the third fixing bracket;
   a rotating arm having one side hinged to an upper side of the third fixing bracket via a hinge link and having a rear end hingeably mounted on an end of the third operating rod; and
   a contact block mounted on the end of the rotating arm so as to transfer torque of the rotating arm which is rotated by operating the third operating cylinder, and selectively in contacted with the variable locator.

7. The hanger changer apparatus of claim 6, wherein the contact block is formed in a cylindrical shape.

8. The hanger changer apparatus of claim 3, further comprising a guide plate for guiding the hanger frame is mounted at one end of the base frame.

9. The hanger changer apparatus of claim 3, wherein each variable unit comprises:
   a first fixing bracket mounted on the base frame;
   a first operating cylinder having a first operating rod, and mounted on top of the first fixing bracket to downwardly rotate the variable locator by back-and-forth operation of the first operating rod;
   a second fixing bracket mounted on top of the base frame, corresponding to the fixing mechanism;
   a second operating cylinder having a second operating rod, and mounted on the second fixing bracket to release fixing of the variable locator fixed by the fixing mechanism; and a restoring mechanism installed at a top portion of the base frame to upwardly rotate the variable locator rotated downward by the first operating cylinder and restore the variable locator to an original position.

* * * * *